(12) United States Patent
Hielkema et al.

(10) Patent No.: US 11,486,514 B2
(45) Date of Patent: Nov. 1, 2022

(54) VALVE ASSEMBLY AND LOCKOUT MECHANISM

(71) Applicant: GE Aviation Systems LLC, Grand Rapids, MI (US)

(72) Inventors: Jerry Dean Hielkema, Rockton, IL (US); Kevin P. Hallisey, Ave Maria, FL (US); Rachael Huffman, Machesney Park, IL (US); Derek Dipietro, Waukesha, WI (US); Julian Alexander Opificius, Elk River, MN (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 17/018,576

(22) Filed: Sep. 11, 2020

(65) Prior Publication Data
US 2022/0082177 A1  Mar. 17, 2022

(51) Int. Cl.
*F16K 35/00* (2006.01)
*F16K 35/10* (2006.01)

(52) U.S. Cl.
CPC .............. *F16K 35/00* (2013.01); *F16K 35/10* (2013.01)

(58) Field of Classification Search
CPC ........... F16K 35/00; F16K 35/06; F16K 35/10
See application file for complete search history.

(56) References Cited

U.S. PATENT DOCUMENTS

| | | | |
|---|---|---|---|
| 437,391 A | 9/1890 | Buehler | |
| 1,231,164 A * | 6/1917 | Jahns | F16K 35/10 137/384 |
| 2,063,442 A * | 12/1936 | Kriege | F16K 35/10 70/180 |
| 2,234,052 A * | 3/1941 | Luenz | F16K 35/00 137/556.3 |
| 2,621,577 A | 12/1952 | Cooper et al. | |
| 2,846,934 A | 8/1958 | Mauldin | |
| 3,362,424 A | 1/1968 | Smith et al. | |
| 3,517,795 A | 6/1970 | Dixon | |
| 4,253,690 A * | 3/1981 | Hollander | F16K 35/00 292/354 |
| 4,995,421 A | 2/1991 | Bonacorsi et al. | |
| 5,236,172 A * | 8/1993 | Friemoth | F16K 35/06 137/385 |
| 5,370,148 A * | 12/1994 | Shafer | F16K 1/22 137/15.25 |
| 5,439,197 A * | 8/1995 | Itoi | F16K 31/506 251/95 |
| 7,845,367 B2 * | 12/2010 | Abe | F16K 35/06 137/385 |

(Continued)

FOREIGN PATENT DOCUMENTS

| | | |
|---|---|---|
| CN | 205937928 U | 2/2017 |
| JP | S5767175 U | 4/1982 |
| JP | S62134982 U | 8/1987 |

*Primary Examiner* — Kevin F Murphy
(74) *Attorney, Agent, or Firm* — Fitch, Even, Tabin & Flannery LLP

(57) ABSTRACT

A valve assembly including a valve body with an inlet port and an outlet port, a flow passage and a valve element disposed within the flow passage, an actuator and a lockout mechanism configured to maintain the position of the valve assembly in an opened position or a closed position. The lockout mechanism can include at least one screw.

21 Claims, 6 Drawing Sheets

(56) References Cited

U.S. PATENT DOCUMENTS

| | | | |
|---|---|---|---|
| 8,282,073 B2* | 10/2012 | Grewal | F16K 35/06 |
| | | | 251/285 |
| 8,382,035 B2 | 2/2013 | Horner et al. | |
| 10,234,055 B2* | 3/2019 | Bertrem | F16K 31/602 |
| 2010/0240291 A1 | 9/2010 | Tanner et al. | |
| 2011/0057141 A1 | 3/2011 | Horner et al. | |

* cited by examiner

VALVE ASSEMBLY AND LOCKOUT MECHANISM

TECHNICAL FIELD

The disclosure generally relates to a valve assembly and more specifically to a valve assembly having a lockout mechanism.

BACKGROUND

Turbine engines, and particularly gas or combustion turbine engines, are rotary engines that extract energy from a flow of combusted gases passing through the engine onto a multitude of rotating turbine blades. Turbine engines can include valves to control the supply of bleed air to various systems including anti-ice systems and environmental control systems. Various types of valves can be used such as butterfly valves, ball valves, check valves, and others. Configurations of the valves can either partially or completely restrict the flow of bleed air.

BRIEF DESCRIPTION

Aspects and advantages of the disclosure will be set forth in part in the following description, or may be obvious from the description, or may be learned through practice of the disclosure herein.

In one aspect, the disclosure relates to a valve assembly, comprising a valve body having an inlet port, an outlet port, and a flow passage therebetween, a valve element movably disposed within the valve body flow passage, an actuator operably coupled to the valve element, the actuator operable between a first position and a second position, to move the valve between an opened position and a closed position, respectively, a lockout mechanism, comprising at least one lockout screw contained in the valve assembly and self-storing therein, the at least one lockout screw adapted to maintain the actuator in a desired position including the first position or the second position.

These and other features, aspects and advantages of the disclosure will become better understood with reference to the following description and appended claims. The accompanying drawings, which are incorporated in and constitute a part of this specification, illustrate the disclosure and, together with the description, serve to explain the principles of the disclosure herein.

BRIEF DESCRIPTION OF THE DRAWINGS

A full and enabling disclosure, including the best mode thereof, directed to one of ordinary skill in the art, is set forth in the specification, which refers to the appended figures in which.

DETAILED DESCRIPTION

Figure 1:
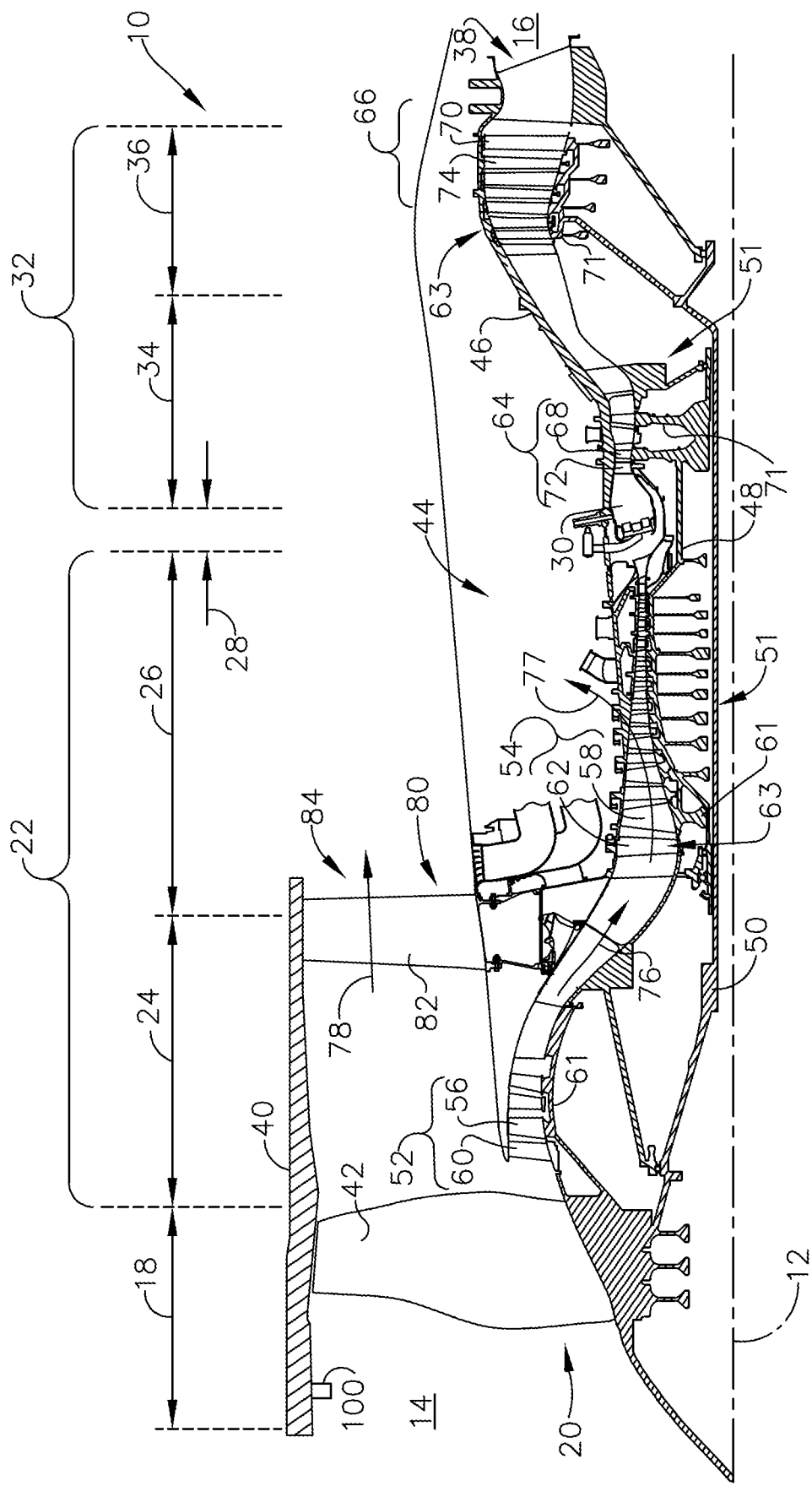
FIG. 1 is a schematic cross-sectional diagram of a gas turbine engine for an aircraft.

Aspects of the disclosure described herein are broadly directed to an apparatus for controlling air flow by a valve and the locking of said valve into a position. For example, a valve can be included to control the supply of bleed air from a turbine engine to one or more system of an aircraft such as an environmental control system or anti-ice system. Some types of valves can have a locking feature which locks the valve in static positions such as open, closed, or intermediate positions. Manual locking features can have a removable fastener that is stowed or secured in near proximity to the valve assembly. These locking fasteners can loosen or be liberated from a stowed position due to vibration. Further, the locking fasteners can be attached to the valve assembly by means of flexible lines which can become loosened due to vibration, and damaged or freed, impairing their utility in locking the valve.

For the purposes of illustration, one exemplary environment within which the valve can be utilized will be described in the form of a turbine engine. Such a turbine engine can be in the form of a gas turbine engine, a turboprop, turboshaft or a turbofan engine, in non-limiting examples. It will be understood, however, that aspects of the disclosure described herein are not so limited and can have general applicability within other valves. For example, the disclosure can have applicability for a valve in other engines or vehicles, and may be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor. The bleed air 77 can also be utilized by other systems and at least one valve assembly 100 (FIG. 2) can be utilized to control the flow of bleed air 77.

A remaining portion of the airflow 78 bypasses the LP compressor 24 and engine core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
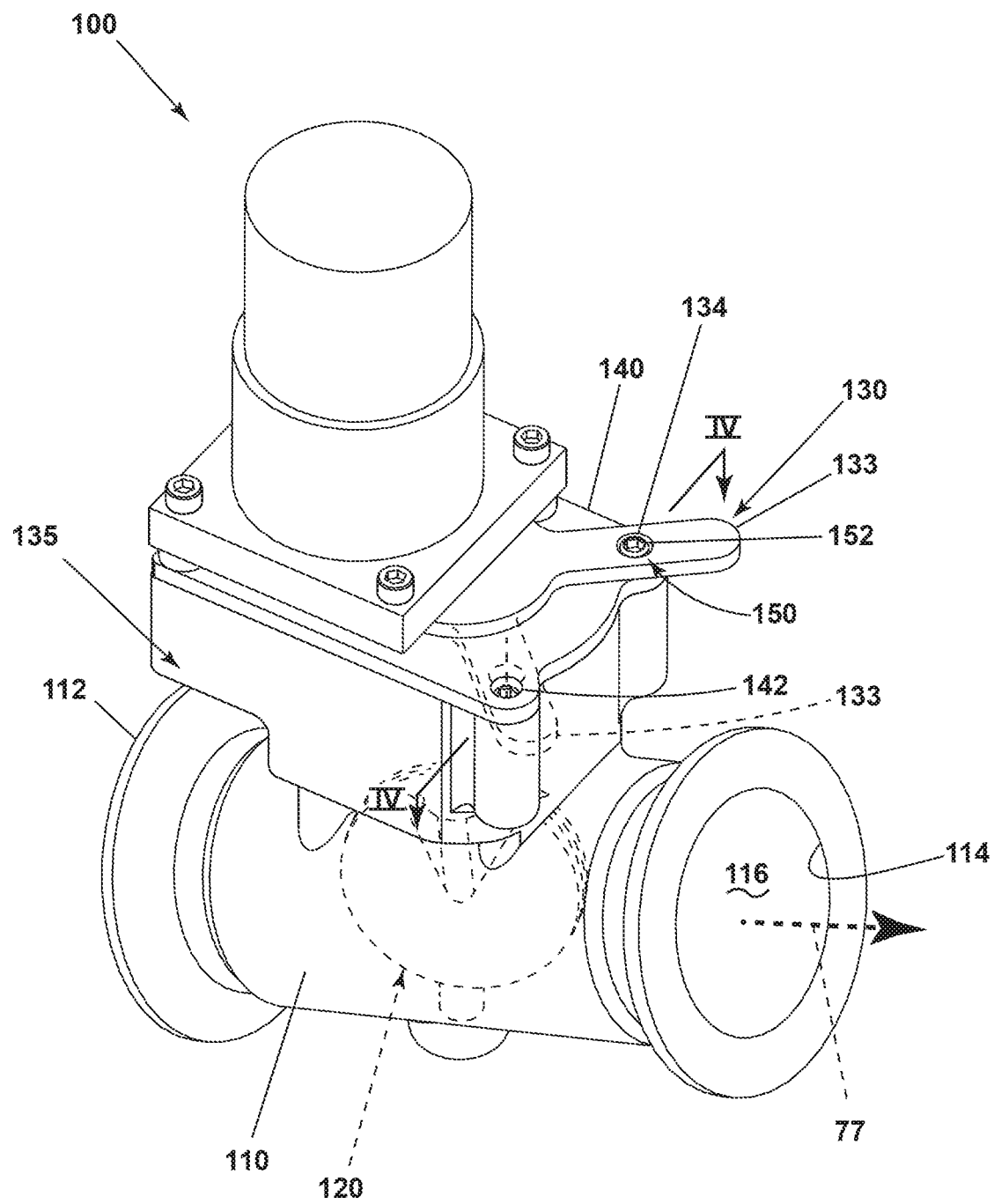
FIG. 2 is a top perspective view of a valve assembly with a moveable arm in accordance with an aspect described herein.

Turning to FIG. 2, a valve housing or valve body 110 is illustrated as being included in the valve assembly 100, the valve body 110 includes an inlet port 112 and an outlet port 114. A flow passage 116 is defined within the valve body 110 between the inlet port 112 and outlet port 114. While the inlet port 112 and the outlet port 114 are illustrated in FIG. 2 as an inline configuration it will be understood that any valve body having any suitable configuration can be utilized.

A valve element 120, an actuator 130, a cover plate 140 and a lockout mechanism 150 are also included in the valve assembly 100. The valve element 120 is movably disposed within the valve body 110. More specifically, the valve element 120 is located within the flow passage 116 and moveable between a closed position where the valve element 120 closes the flow passage 116 and an opened position (FIG. 2) wherein bleed air 77 can flow through the flow passage 116.

Figure 3:
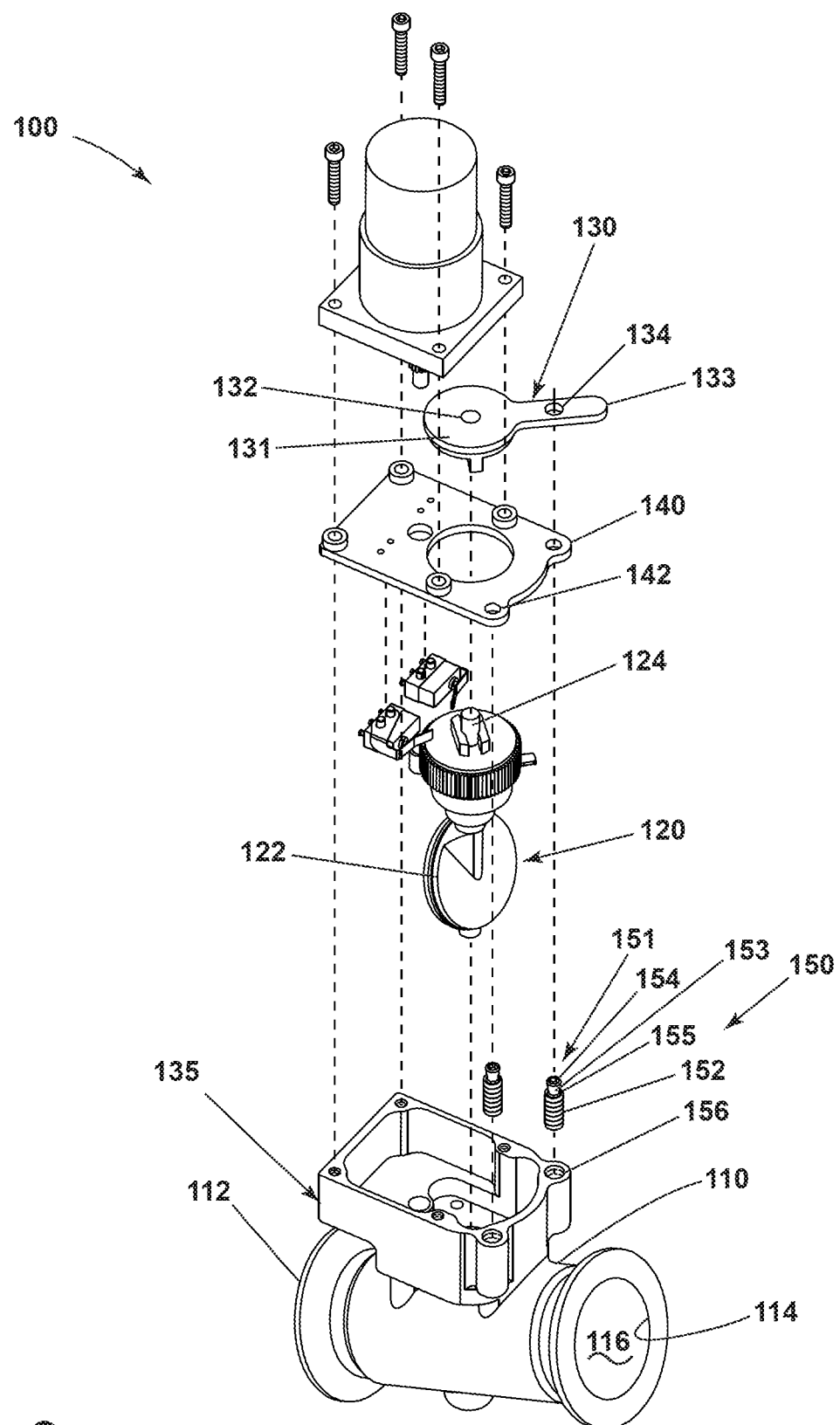
FIG. 3 is a partially exploded view of the valve assembly of FIG. 2, in accordance with an aspect described herein.

Referring now to FIG. 3, the valve element 120 can be any suitable valve element and by way of non-limiting example has been illustrated as a butterfly valve element having a disk 122 having an axis across the diameter of the flow passage 116. It is contemplated that the disk 122 has an area substantially the same as the cross-sectional area of the flow passage 116 and the valve disk 122 can include a circumferential sealing ring (not shown) of various configurations to effectively seal the flow of air through the flow passage 116. The valve disk 122 can seal or close off the flow passage 116 when the valve element 120 is in the closed position. It will be understood that the when the valve element 120 is in a closed position, it seals the flow passage and completely prevents bleed air from moving through the flow passage 116. The opened position can be any position which allows at least partial air flow through the flow passage 116. A shaft or stem 124 extends from the disk 122 and operably couples to an actuator 130. A biasing element (not shown) such as a spring that provides a spring force or biasing force can be included to maintain the valve element 120 in an opened or closed position. The stem 124 is at least partially enclosed within a housing 135.

The actuator 130 includes a central portion 131 with a hole 132, which receives the stem 124, and an override arm or moveable protrusion 133 having an opening 134 that extends therefrom. The actuator 130 engages the stem 124 such that the valve element 120 is operably coupled to the actuator 130. The actuator 130 can be in a first position or a second position, which corresponds to the valve element 120 being in an opened position or a closed position, respectively. When the actuator 130 is in a first position (FIG. 2), the valve element 120 is in an open position (shown in phantom in FIG. 2), which allows bleed air 77 to move through the flow passage 116. When the actuator 130 is in a second position (FIG. 2), the valve element 120 is in a closed position, and bleed air 77 cannot move through the flow passage 116.

A set of lockout screws 151 is included in the lockout mechanism 150 and is self-stored or contained within the housing 135 of the valve assembly 100. In the illustrated example, the set of lockout screws 151 includes at least two lockout screws 153 with each lockout screw 153 having a first set of threads 152. Each of the set of lockout screws 151 is relatively spaced and fixedly located in-line with the first position and the second position of the moveable protrusion 133 of the actuator 130. Each of the set of lockout screws 151 is retained within a receiver 156. A cover plate 140 can be utilized to enclose portions of the valve body 110 and portions of the receivers 156. Apertures 142 within the cover plate 140 still allow for access to the receivers 156 and the set of lockout screws 151 contained therein. The receivers 156 and the apertures 142 are aligned with the opening 134 when the actuator 130 is moved to the first position and the second position.

Each of the set of lockout screws 151 has the first set of threads 152 along a portion of its length and a socket head 154 located at a distal end, where the lockout screw 153 is tapered at a neck 155 between the socket head 154 and the first set of threads 152. The neck 155 tapers towards the first set of threads 152. The set of lockout screws 151 can further exemplified by set-screws having a socket head 154 and a neck 155 adjacent to the socket head 154.

It will be understood that when assembled, the valve element 120 is received within the flow passage 116, the set of lockout screws 151 are each received within a corresponding receiver 156, the cover plate 140 is fastened to a portion of the valve body 110 via any suitable mechanism. The stem 124 extends through a hole 132 in the cover plate 140 to engage with the actuator 130, which is positioned over the cover plate 140 and retained by a cap.

Figure 4:
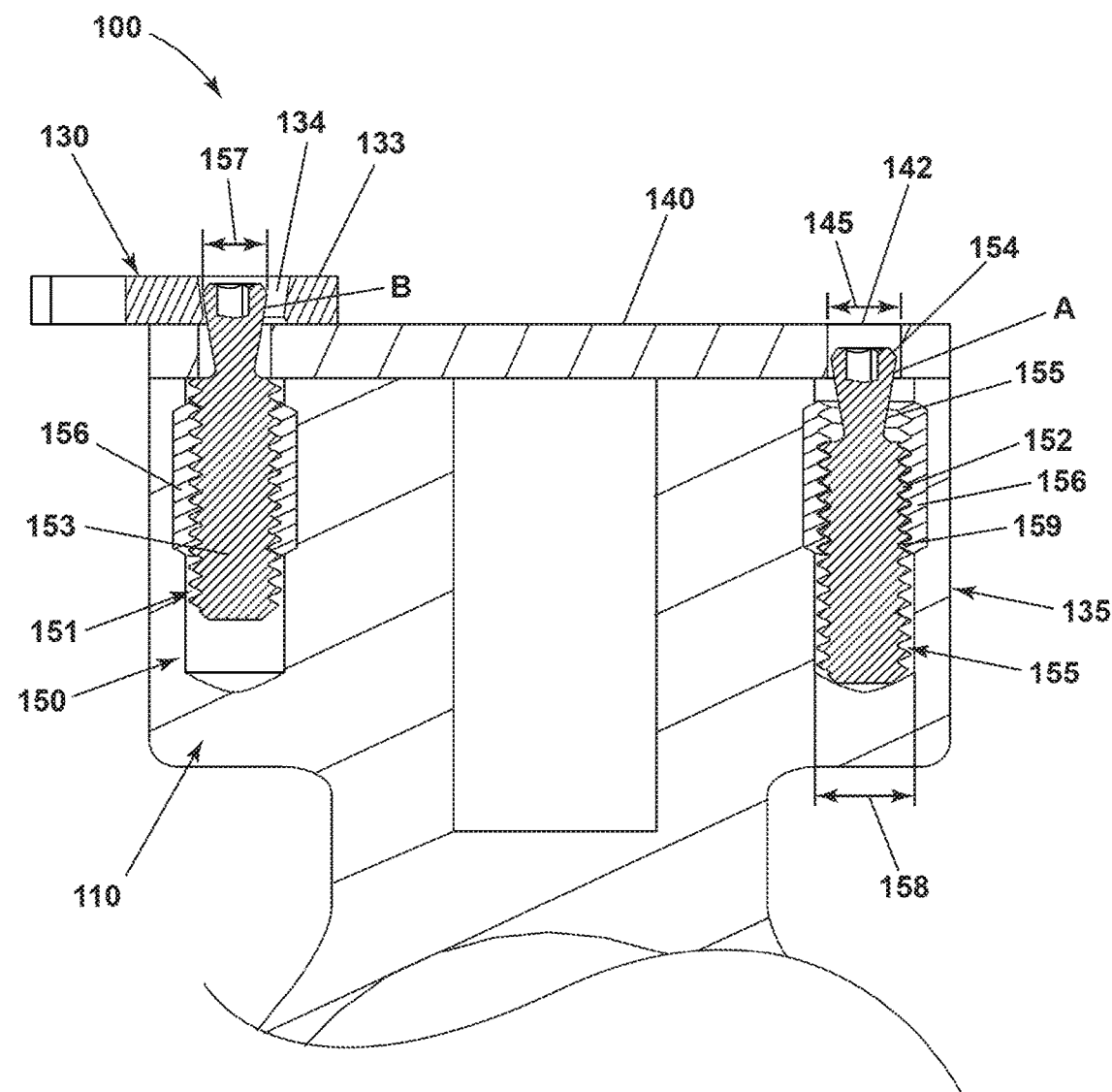
FIG. 4 is a cross-sectional view of the rotating valve assembly showing the lockout screw positions, in accordance with an aspect described herein.

Referring now to FIG. 4, the lockout mechanism 150 of the valve assembly 100 engages the actuator 130. As can be better seen in FIG. 4, a second set of threads 159 is located in each of the receivers 156. The second set of threads 159 is configured to mate with the first set of threads 152 on one of the set of lockout screws 151. The threaded engagement allows the set of lockout screws 151 to be moveable with the respect to a depth of a corresponding one of the set of receivers 156. The second set of threads 159 can be included within all of a portion of the depth of the receiver 156. Threading the lockout screw 153 therein raises and lowers the lockout screw 153 into and partially out of the receiver 156. The movement of the lockout screw 153 is limited by the cover plate 140 and thus regardless of position, the lockout screw 153 is retained within the receiver 156 and thus is self-stored within the housing 135.

It should be understood that the arm or moveable protrusion 133 of the actuator 130 confronts the cover plate 140 and can be arranged such that the opening 134 overlies one of the set of receivers 156 containing one of the set of lockout screws 151. The lockout screw 153 can be raised within the receivers 156 such that it partially extends past the cover plate and engages with the opening 134. Because the aperture 142 is larger than the socket head 154 but smaller than the portion having the first set of threads 152 the lockout screw 153 remains housed within the receiver 156.

As seen more clearly in FIG. 4, the cover plate 140 is arranged on the valve body 110 such that apertures 142 correspond to and overlie the set of receivers 156. The socket head 154 has a width 157 smaller than the width 145 of the aperture 142. In one aspect, the top of the first set of threads 152 forms a collar such that the width 158 of the first set of threads 152 of the lockout screw 153 is greater than the width 145 of the apertures 142. Because the width 158 of the first set of threads 152 is greater than the width of the apertures 142, only the socket head 154 of the lockout screw 153 can move through the aperture 142 and therefore the lockout screw 153 can be retained within the receiver 156 underneath the cover plate 140. In this manner the lockout screw 153 is confined to the receiver 156 of the lockout mechanism 150 within valve body 110.

The set of lockout screws 151 are moveable between a stowed position A and a locked position B. In the stowed position A, one of the set of lockout screws 151 is in threaded engagement with the receiver 156 and is threaded past the threads in the receiver 156. The socket head 154 is positioned at least below the top surface of the cover plate 140, and is within or below the aperture 142 of the cover plate 140. Furthermore, when the set of lockout screws 151 is in the stowed position, the socket head 154 is out of engagement with the actuator 130.

In the locked position B, at least one of the set of lockout screws 151 engages the moveable protrusion 133 and is thus in engagement with the actuator 130. In the locked position B, at least one of the set of lockout screws 151 is partially received within the receiver 156 such that the socket head 154 emerges through the aperture 142 and is positioned within the opening 134 of the moveable protrusion 133. The opening 134 can have a taper that is complementary to the neck 155. In this configuration, the moveable protrusion 133 cannot move due to the engagement with the socket head 154 and neck 155 of the set of lockout screws 151. Furthermore, the set of lockout screws 151 is anchored by engagement with the receiver 156 and is maintained under the cover plate 140.

During operation, bleed air 77 can be introduced into the inlet port 112 of the valve body 110. The flow of bleed air 77 through the flow passage 116 is indicated by an arrow (FIG. 2) and may be accomplished when the valve assembly is in an opened position. During operation, the actuator 130 can be maintained in a desired position, including the first position or the second position, by the lockout screw 153 engaging the moveable protrusion 133 via the opening 134. More specifically, as illustrated in FIG. 4, when the actuator 130 is in the first position, the opening 134 of the protrusion overlies a first of the set of receivers 156 containing a first of the lockout screws 151. The lockout screw 153 can be raised such that it engages the opening 134 and holds the actuator 130 in the first position and thereby holds the valve element 120 in the corresponding opened position. If the actuator 130 is in the second position, the opening 134 of the moveable protrusion 133 overlies a second of the set of receivers 156 containing a second of the lockout screws 151, which can engage the opening 134 when the actuator is in the second position and holding the actuator 130 in the second position and thereby hold the valve element 120 in the corresponding closed position.

Figure 5:
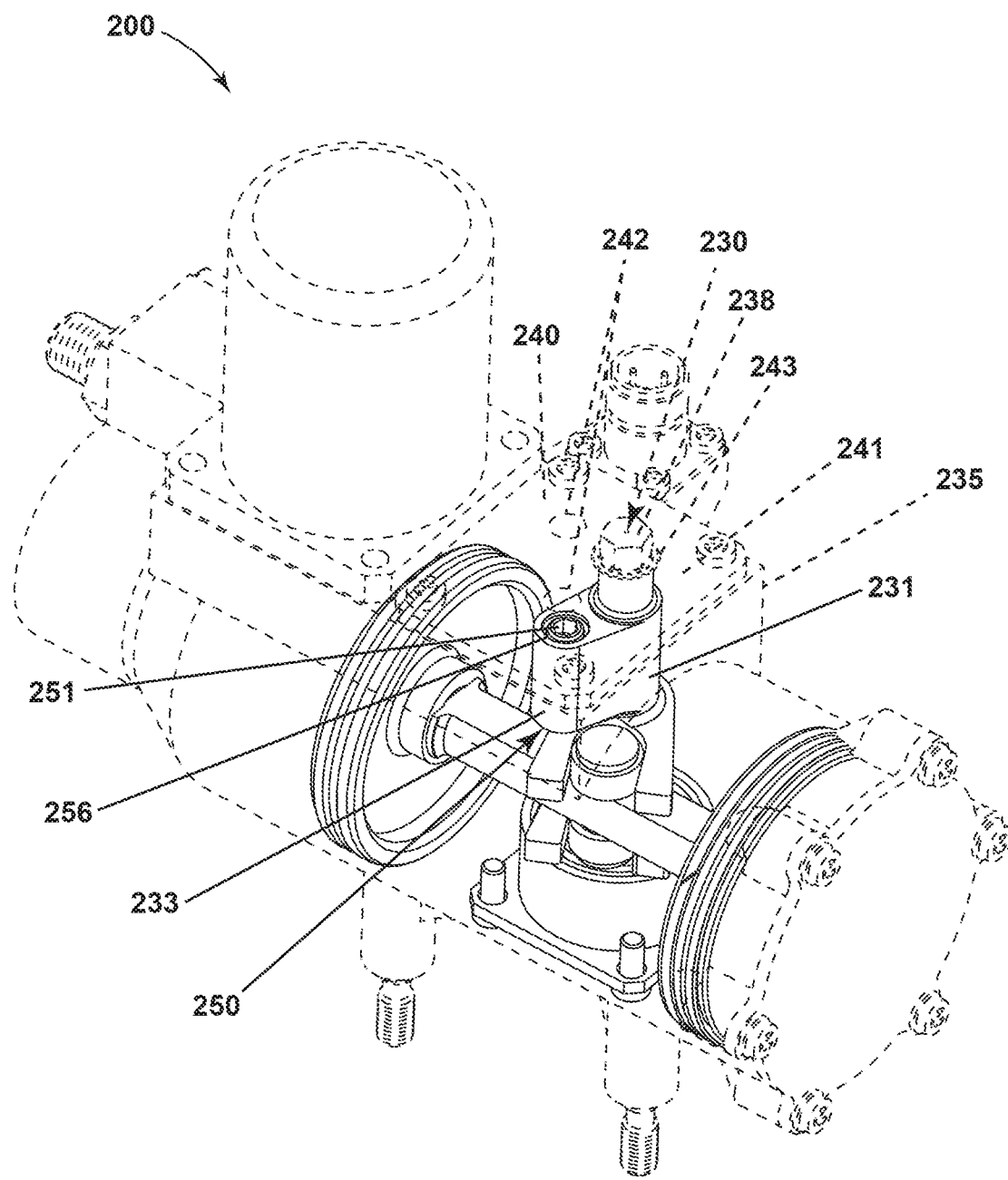
FIG. 5 is transparent view of a rotating valve assembly, in accordance with an additional aspect described herein.

FIG. 5 illustrates an alternative valve assembly 200. The valve assembly 200 is similar to the valve assembly 100 previously described. Therefore, like parts will be identified with like numerals increased by 100, and it is understood that the description of like parts of the valve assembly 100 applies to the valve assembly 200 and lockout mechanism 250, unless otherwise noted. Similar to the assembly and mechanism previously described, an actuator 230, an outer housing 235, a cover 240 and a lockout mechanism 250 are included in the valve assembly 200. The actuator 230 includes a central portion or shaft 231, which can be operably coupled to a valve element 220 (not illustrated herein) such that when the actuator 230 can be in a first position or a second position the valve element 220 (not shown) can be in an opened position or a closed position, respectively. Further, the actuator 230 can be in a third position corresponding to the valve element 220 being in an intermediate position, wherein the disk (not shown) is not in-line with the air flow in the flow passage (not shown), yet allows partial air flow through the flow passage (not shown).

While the outer housing 235 and the cover 240 are fastened together as in the earlier assembly, one difference is that a plurality of openings 242 and a shaft opening 243 are included in the cover 240. The cover 240 has a lower surface 241. Both the outer housing 235 and the cover 240 have been illustrated in phantom so the mechanism interior thereof can be more easily seen. The majority of the shaft 231 of the actuator 230 is located underneath the cover 240 and within the outer housing 235. A moveable arm 233 having a cavity 234 extends from the 231 and is mounted thereto such that the moveable arm 233 is fixedly coupled to the shaft 231.

An end portion 238 of the shaft 231 protrudes through the shaft opening 243 in the cover 240. The end portion 238 can have a hexagonal shape for engaging with a tool. It will be understood that any suitable shape, profile, or design can be utilized.

As part of the lockout mechanism 250, a receiver 256 is included in the moveable arm 233 of the actuator 230. More specifically the receiver 256 can be defined at least partially by a cavity 234 formed within the moveable arm 233. A second set of threads 259 is defined in at least a portion of the cavity 234 and therefore located within the receiver 256.

It will be understood that the second set of threads 259 need not extend the length of the cavity 234. The cover 240 can be utilized to enclose portions of the moveable arm 233 and the receiver 256.

A lockout screw 251 is retained within the receiver 256, the lockout screw 251 including a first set of threads 252. The lockout screw 251 is retained within the receiver 256. The plurality of openings 242 in the cover 240 allow for access to the lockout screw 251. The receiver 256 is illustrated as aligned with one of the plurality of openings 242. This can correspond to the actuator 230 being in the first position. As the moveable arm 233 and receiver 256 are enclosed within the outer housing 235 and cover 240, the lockout screw 251 is self-stored within the outer housing 235.

It will be understood that when assembled, the valve element 220 is received within a fluid passage, the lockout screw 251 is received within a corresponding receiver 256, the cover 240 is fastened to a portion of the valve body (not shown) via any suitable mechanism. The stem 224 extends through a shaft opening 243 in the cover 240 and is retained by the end portion 238 which is positioned over the cover 240.

It will be understood that the actuator 230 is movable between the first position and a second position via rotation of the shaft 231. More specifically, a user can move the shaft 231 by turning the end portion 238, such as with a tool having a complementary profile. The shaft 231 and the moveable arm 233 can be rotated therewith to the second position wherein the receiver 256 within the moveable arm 233 is aligned with another or second of the plurality of openings within the cover 240. While not illustrated the actuator 230 can also be capable of aligning with an intermediate opening between the first and second position to define a third position. The plurality of openings 242 within the cover 240 allow for access to the receiver 256 and the lockout screws 251 contained therein. The receiver 256 and one of the plurality of openings are aligned when the actuator 230 is moved to the first position and the second position.

Figure 6:
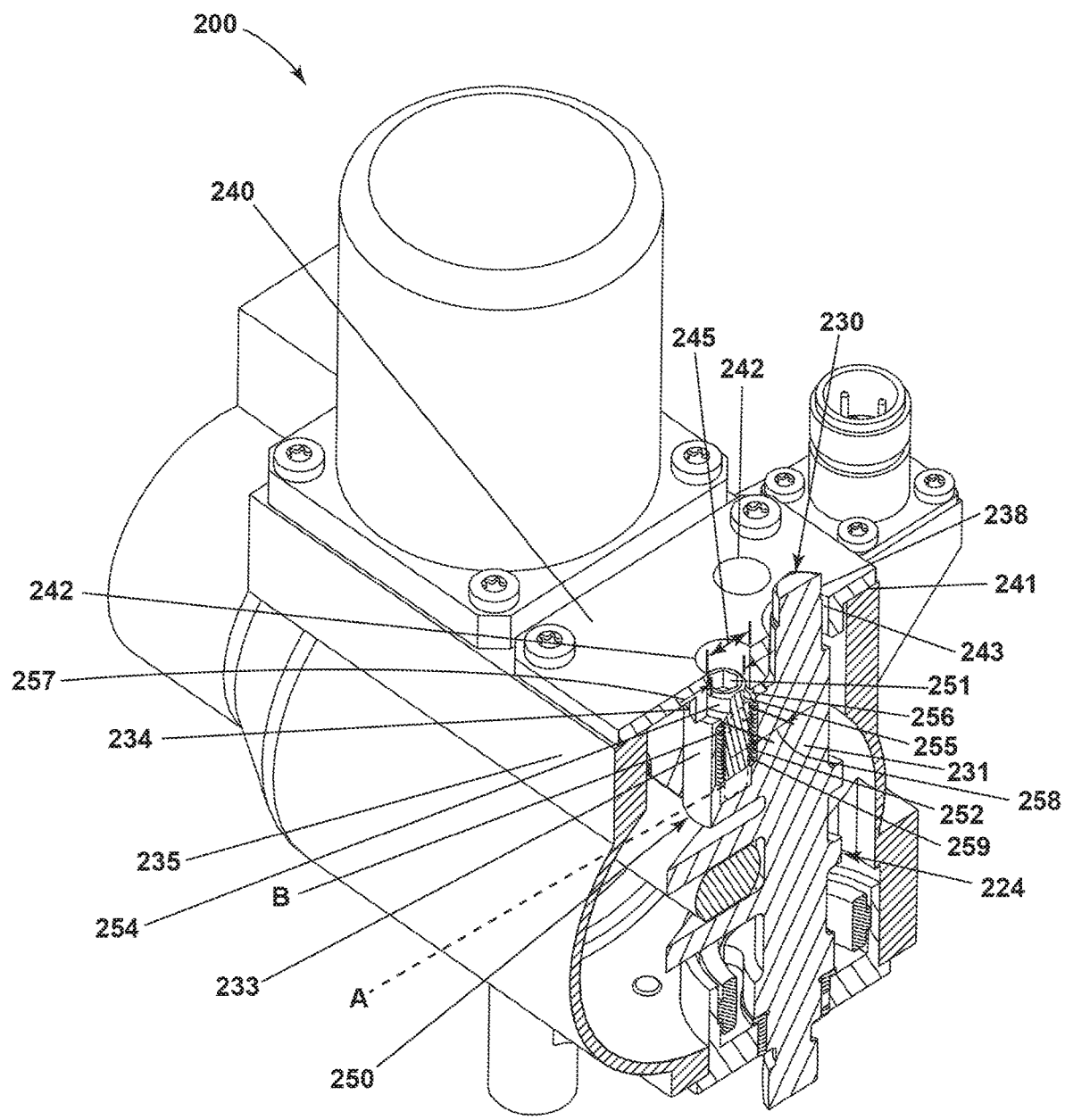
FIG. 6 is a top perspective and cross sectional view through the rotating valve assembly including the lockout pin in a stowed position and in locked position, in accordance with an additional aspect described herein.

As can be better seen in FIG. 6, the threaded engagement of the lockout screw 251 with the receiver 256 allows the lockout screw 251 to be moveable within the receiver 256. The second set of threads 259 has only been illustrated within a portion of the receiver but can be included within the entire depth of the receiver 256. Threading the lockout screw 251 therein raises and lowers the lockout screw 251 within the receiver 256. The lockout screw 251 can be raised within the receiver 256 such that it partially extends into one of the plurality of openings 242 in the cover 240. Because the plurality of openings 242 are each larger than the socket head 254 but smaller than the portion of the lockout screw 251 having the first set of threads 252 the lockout screw 251 remains housed within the receiver 256.

As illustrated, the socket head 254 has a width 257 smaller than the width 245 of the opening 242. The width 258 of the first set of threads 252 of the lockout screw 251 is greater than the width 245 of the openings 242. Thus, the at least one lockout screw 251 can be retained within the receiver 256 by the cover 240. In this manner, the movement of the lockout screw 251 is limited by the cover 240 and thus regardless of position the lockout screw 251, the lockout screw 251 is at least partially retained within the receiver 256.

The lockout screw 251 is moveable between a stowed position A (in phantom) and a locked position B. In the stowed position A, the lockout screw 251 is in threaded engagement with the receiver 256 and the socket head 254 is positioned below the lower surface 241 of the cover 240. In this aspect, when the lockout screw 251 is in the stowed position, the socket head 254 is out of engagement with the cover 240.

The lockout screw 251 can be in a locked position B engaging the cover 240. In the locked position, the lockout screw 251 is threaded upwards within the receiver 256 such that the socket head 254 is at least partially located in one of the openings 242. While not illustrated, it is contemplated that each of the openings 242 can taper such that it is complementary to the neck 255. In this configuration, the actuator 230 is fixed due to the engagement of the socket head 254 and neck 255 of the lockout screw 251 with both the receiver 256 and the cover 240. Furthermore, the lockout screw 251 is anchored by engagement with the receiver 256 and is maintained under the cover 240.

The disclosed valve assemblies include multiple means for keeping the lockout screw in position. The primary means by which the lockout mechanism maintains the lockout screw in position is the threaded engagement between the lockout screw and the receiver or the threading past of the threaded section. The secondary means is the collar formed by the screw threads; this portion of the lockout screws is wider than the apertures in the cover plate, thus containing the lockout screws underneath the cover plate. Furthermore, the lockout mechanism includes primary means, secondary means, as well as a tertiary means for maintaining the at least one lockout screw in the locked position. The tertiary means includes the angled walls of the apertures combined with the complementary angled neck of the lockout screws. The disclosed lockout mechanism can be included in the valve assembly of an aircraft to provide reliable and robust control of the bleed air.

The lockout mechanism described herein provides several advantages for a robust system. The lockout mechanism does not have ambiguous states, in other words, the lockout screws are in one of two possible positions, a locked position or a stowed position. General tools can be used to move the lockout screw between the positions and specialized tools are not needed. The lockout positions can be changed quickly, reducing wait times and minimizing delays.

In other systems, components can leave the desired position due to vibrations. Because the lockout screws are captured within the above described assembly whether they are engaged or stowed, they cannot be misplaced during operation or when a user changes their position. This self-storage of these components prevents them from becoming self-liberated and subsequently becoming foreign object debris that interferes with the operation of other components of the aircraft.

The lockout screws in this mechanism are held in place by multiple diverse means that avoid the use of lanyards or other tethers that can become damaged or frayed. The lockout screws are tightly engaged in the mechanism by the threaded receiver portion. Furthermore, the threaded portion of the lockout screws forms a collar that is wider than the access hole in the cover of the mechanism; therefore, the screws and the receivers are trapped beneath the cover, which is securely fastened. The neck of the lockout screws can have a taper complementary in shape to the opening in the cover that engages the side of the opening when biased by a spring. The angled interface created by the taper provides an additional frictional component that must be overcome in order to disengage, thus providing another means of anchoring the screws in a desired position. Furthermore, a valve stem on a typical valve has a torque bias, induced by a spring, which can cause the valve to move towards an open or closed position. In this mechanism, that torque bias translates to the actuator which applies a force to a deployed lockout screw by means of the complementary taper. The resultant force on the taper includes a force tending to draw the locking screw out of the receiver, thus limiting the possibility of the screw returning to a stowed position due to vibrationally induced rotation.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A valve assembly, comprising: a valve body having an inlet port, an outlet port, and a flow passage therebetween; a valve element movably disposed within the valve body flow passage; an actuator operably coupled to the valve element, the actuator operable between a first position and a second position, to move the valve element between an opened position and a closed position, respectively; a lockout mechanism, comprising at least one lockout screw contained in the valve assembly and self-storing therein, the at least one lockout screw adapted to maintain the actuator in a desired position including the first position or the second position.

The valve assembly of any preceding clause wherein the valve body further comprises a set of receivers and the at least one lockout screw includes a set of lockout screws with each of the set of receivers including one of the set of lockout screws self-storing therein.

The valve assembly of any preceding clause wherein the actuator includes a protrusion including an opening, the opening of the protrusion overlying a first of the set of receivers when the actuator is in the first position and the opening of the protrusion overlying a second of the set of receivers when the actuator is in the second position.

The valve assembly of any preceding clause wherein the actuator can be locked into the desired position by engaging the one of the set of lockout screws in the opening.

The valve assembly of any preceding clause wherein a first set of threads are disposed on each of the set of lockout screws and a second set of threads are located on each of the set of receivers, the second set of threads configured to mate with the first set of threads.

The valve assembly of any preceding clause wherein at least one of the set of lockout screws includes a set-screw having a socket head and wherein the set-screw is tapered at a neck adjacent the socket head.

The valve assembly of any preceding clause, further comprising a cover plate mounted to the valve body and having apertures corresponding to the set of receivers wherein the socket head is smaller in width than one of the apertures and the first set of threads are wider than the one of the apertures.

The valve assembly of any preceding clause wherein the protrusion is an override arm and the set of lockout screws are moveable between a stowed position out of engagement with the override arm and a locked position engaging the override arm.

The valve assembly of any preceding clause wherein the opening further comprises a taper complementary to the neck.

The valve assembly of any preceding clause wherein the valve body includes a receiver configured to contain the at least one lockout screw and the at least one lockout screw is moveable between a stowed position out of engagement with the actuator and a locked position engaging the actuator.

The valve assembly of any preceding clause wherein the actuator comprises a receiver and a cover, the receiver and the cover are adapted to relatively move between the first position and the second position.

The valve assembly of any preceding clause wherein the cover includes a plurality of openings.

The valve assembly of any preceding clause wherein the receiver comprises a cavity configured to contain the at least one lockout screw and the at least one lockout screw is moveable between a stowed position out of engagement with the cover and a locked position engaging the cover and located within one of the plurality of openings wherein the actuator can be locked into the desired position by engaging the at least one lockout screw in one of the plurality of openings.

The valve assembly of any preceding clause wherein the cover includes three openings and the lockout screw is operable to move and be locked into an intermediate position between the first position and the second position and wherein the valve element is correspondingly moved to a partially-opened position when the lockout screw is in the intermediate position.

The valve assembly of any preceding clause wherein the actuator can be locked into the desired position by engaging the at least one lockout screw in one of the plurality of openings.

The valve assembly of any preceding clause wherein a first set of threads are disposed on the at least one lockout screw and a second set of threads are located within the receiver, the second set of threads configured to mate with the first set of threads.

The valve assembly of any preceding clause wherein the at least one lockout screw includes a set-screw having a socket head and a neck adjacent the socket head and wherein the socket head is smaller in width than each of the plurality of openings and the first set of threads are wider than each of the plurality of openings.

The valve assembly of any preceding clause wherein the receiver forms a portion of a moveable arm at least partially enclosed within an outer housing.

The valve assembly of any preceding clause wherein the valve assembly is adapted for use in an aircraft and the lockout mechanism includes primary means and secondary means for maintaining the at least one lockout screw in a stowed position and the lockout mechanism includes primary means, secondary means, and tertiary means for maintaining the at least one lockout screw in the locked position.

An assembly for use with a valve assembly having a valve element disposed within a valve body flow passage, the assembly comprising: an actuator operably coupled to the valve element, the actuator operable between a first position and a second position, to move the valve element between an opened position and a closed position, respectively; a housing provided with one of the actuator or the valve assembly; a lockout mechanism, comprising at least one lockout screw contained in the housing and self-storing therein, the at least one lockout screw adapted to maintain the actuator in a desired position including the first position or the second position.

The assembly of any preceding clause wherein the housing further comprises a set of receivers and the at least one lockout screw includes a set of lockout screws with each of the set of receivers including one of the set of lockout screws self-storing therein and wherein the actuator can be locked into the desired position by engaging the one of the set of lockout screws in the opening.

The assembly of any preceding clause, further comprising a cover plate mounted to the valve body and having apertures corresponding to the set of receivers wherein the socket head is smaller in width than one of the apertures and the first set of threads are wider than the one of the apertures.

The assembly of any preceding clause wherein the valve body includes a receiver configured to contain the at least one lockout screw and the at least one lockout screw is moveable between a stowed position out of engagement with the actuator and a locked position engaging the actuator.

The assembly of any preceding clause wherein the actuator comprises a receiver and a cover having a plurality of openings, the receiver and the cover are adapted to relatively move between the first position and the second position wherein the receiver comprises a cavity configured to contain the at least one lockout screw and the at least one lockout screw is moveable between a stowed position out of engagement with the cover and a locked position engaging the cover and located within one of the plurality of openings.

What is claimed is:

1. A valve assembly, comprising:
   a valve body having an inlet port, an outlet port, and a flow passage therebetween;
   a valve element movably disposed within the valve body flow passage;
   an actuator operably coupled to the valve element, the actuator operable between a first position and a second position, to move the valve element between an opened position and a closed position, respectively;
   a lockout mechanism, comprising at least one lockout screw contained in a receiver in the valve assembly, the at least one lockout screw adapted to maintain the actuator in a desired position including the first position or the second position, the at least one lockout screw having a longitudinal axis and movable along the longitudinal axis to a locked position maintaining the actuator in the desired position and an unlocked position allowing the actuator to move; and;
   a cover disposed over the receiver, the cover comprising an aperture disposed over the receiver to allow tool access to the at least one lockout screw in the receiver, wherein a head of the at least one lockout screw is smaller in width than the aperture and a width of a body of the at least one lockout screw is wider than the aperture such that the at least one lockout screw is retained within the receiver by the cover.

2. The valve assembly of claim 1 wherein the at least one lockout screw is moveable between the unlocked position out of engagement with the actuator and the locked position engaging the actuator.

3. The valve assembly of claim 1 wherein the actuator further comprises the receiver, the receiver being adapted to move relative to the cover when the actuator is moved between the first position and the second position and wherein the cover includes a plurality of apertures.

4. The valve assembly of claim 3 wherein the receiver comprises a cavity configured to contain the at least one lockout screw and the at least one lockout screw is moveable between the unlocked position out of engagement with the cover and the locked position with the head of the at least one lockout screw located within one of the plurality of apertures wherein the actuator is configured to be locked into the desired position by positioning the head of the at least one lockout screw in one of the plurality of apertures.

5. The valve assembly of claim 4 wherein the plurality of apertures of the cover include three apertures and the actuator is operable to move and be locked into an intermediate position between the first position and the second position and wherein the valve element is correspondingly moved to a partially-opened position when the actuator is in the intermediate position.

6. The valve assembly of claim 4 wherein a first set of threads are disposed on the at least one lockout screw and a second set of threads are located within the receiver, the second set of threads configured to mate with the first set of threads.

7. The valve assembly of claim 6 wherein the at least one lockout screw includes a setscrew having a socket head and a neck adjacent the socket head and wherein the socket head is smaller in width than each of the plurality of apertures and the first set of threads are wider than each of the plurality of apertures.

8. The valve assembly of claim 1 wherein the valve assembly is adapted for use in an aircraft and the lockout mechanism includes primary means and secondary means for maintaining the at least one lockout screw in the unlocked position and the lockout mechanism includes primary means, secondary means, and tertiary means for maintaining the at least one lockout screw in the locked position.

9. The valve assembly of claim 1, wherein the valve body further comprises a set of receivers and the at least one lockout screw includes a set of lockout screws with each of the set of receivers including one of the set of lockout screws, and wherein at least one of the lockout screws of the set of lockout screws being embedded entirely within the valve assembly when in the unlocked position.

10. The valve assembly of claim 9, wherein the actuator includes a protrusion including an opening, the opening of the protrusion overlying a first of the set of receivers when the actuator is in the first position and the opening of the protrusion overlying a second of the set of receivers when the actuator is in the second position.

11. The valve assembly of claim 10 wherein the actuator can be locked into the desired position by engaging the one of the set of lockout screws in the opening.

12. The valve assembly of claim 11 wherein a first set of threads are disposed on each of the set of lockout screws and a second set of threads are located on each of the set of receivers, the second set of threads configured to mate with the first set of threads.

13. The valve assembly of claim 12 wherein at least one of the set of lockout screws includes a set-screw having a socket head and wherein the set-screw is tapered at a neck adjacent the socket head.

14. The valve assembly of claim 13, wherein the cover comprises a plurality of apertures, the plurality of apertures corresponding to the set of receivers, wherein the socket head is smaller in width than one of the apertures and the first set of threads are wider than the one of the apertures.

15. The valve assembly of claim 14 wherein the protrusion is an override arm and the set of lockout screws are moveable between a stowed position out of engagement with the override arm and a locked position engaging the override arm.

16. The valve assembly of claim 13, wherein the socket head of the set-screw tapers towards the neck, such that the width of the set-screw decreases from a free end of the socket head to the neck.

17. The valve assembly of claim 16, wherein the one of the apertures or the opening in the protrusion has a taper that is complementary to the taper of the socket head.

18. An assembly for use with a valve assembly having a valve element disposed within a valve body flow passage, the assembly comprising:
an actuator operably coupled to the valve element, the actuator operable between a first position and a second position, to move the valve element between an opened position and a closed position, respectively;
a housing provided with one of the actuator or the valve assembly;
a lockout mechanism, comprising at least one lockout screw contained in a receiver in the housing, the at least one lockout screw adapted to maintain the actuator in a desired position including the first position or the second position, the at least one lockout screw having a longitudinal axis and movable along the longitudinal axis to a locked position maintaining the actuator in the desired position and an unlocked position allowing the actuator to move; and;
a cover disposed over the receiver, the cover comprising an aperture disposed over the receiver to allow tool access to the at least one lockout screw in the receiver, wherein a socket head of the at least one lockout screw is smaller in width than the aperture and a first set of threads of the at least one lockout screw are wider than the aperture such that the at least one lockout screw is retained within the receiver by the cover.

19. The assembly of claim 18, wherein the at least one lockout screw is moveable between the unlocked position out of engagement with the actuator and the locked position engaging the actuator.

20. The assembly of claim 18, wherein the housing further comprises a set of receivers and the at least one lockout screw includes a set of lockout screws with each of the set of receivers including one of the set of lockout screws, wherein the actuator can be locked into the desired position by engaging the one of the set of lockout screws in an opening of the housing, and wherein at least one of the lockout screws of the set of lockout screws being embedded entirely within the valve assembly when in the unlocked position.

21. An assembly for use with a valve assembly having a valve element disposed within a valve body flow passage, the assembly comprising:
an actuator operably coupled to the valve element, the actuator operable between a first position and a second position, to move the valve element between an opened position and a closed position, respectively;

a housing provided with one of the actuator or the valve assembly; and a lockout mechanism, comprising at least one lockout screw contained in the housing, the at least one lockout screw adapted to maintain the actuator in a desired position including the first position or the second position, the at least one lockout screw having a longitudinal axis and movable along the longitudinal axis to a locked position maintaining the actuator in the desired position and an unlocked position allowing the actuator to move, wherein the actuator comprises a receiver and a cover comprises a plurality of openings, the receiver and the cover are adapted to relatively move between the first position and the second position wherein the receiver comprises a cavity configured to contain the at least one lockout screw and the at least one lockout screw is moveable between the unlocked position out of engagement with the cover and the locked position engaging the cover and located within one of the plurality of openings, wherein a head of the at least one lockout screw is smaller in width than the one of the plurality of openings and a width of a body of the at least one lockout screw is wider than the one of the plurality of openings such that the at least one lockout screw is retained within the receiver by the cover.

\* \* \* \* \*